(Model.)

B. N. HAWES.
APPARATUS FOR REFINING OILS.

No. 444,833. Patented Jan. 20, 1891.

WITNESSES
Carroll J. Webster
Anna J. Lehaney

INVENTOR
Benjamin N. Hawes
By William Webster
Atty

UNITED STATES PATENT OFFICE.

BENJAMIN N. HAWES, OF TOLEDO, OHIO.

APPARATUS FOR REFINING OIL.

SPECIFICATION forming part of Letters Patent No. 444,833, dated January 20, 1891.

Application filed December 2, 1889. Serial No. 332,179. (Model.)

*To all whom it may concern:*

Be it known that I, BENJAMIN N. HAWES, a citizen of the United States, residing at Toledo, in the county of Lucas and State of Ohio, have invented certain new and useful Improvements in an Apparatus for Refining Oils; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an apparatus for refining oils, and has for its object the treatment of petroleum and other oils to thoroughly desulphurize the same by a continuous process, and thereby render the oil adaptable for illuminating or other purposes.

The invention consists in the parts and combination of parts hereinafter described, and pointed out in the claims.

Figure 1:
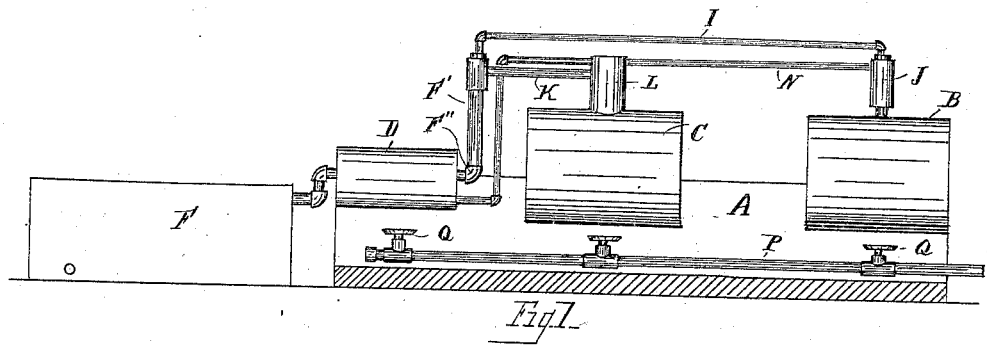
Figure 2:
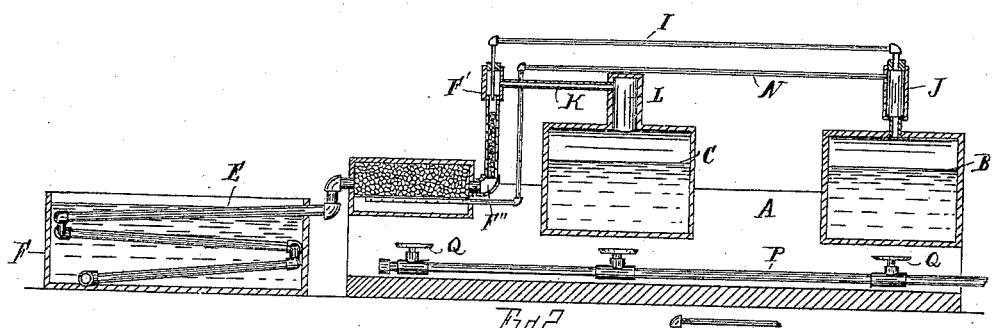
Figure 3:
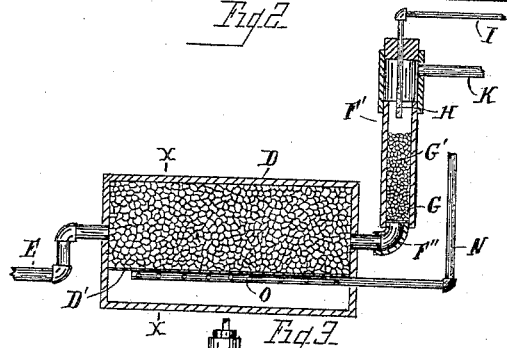
Figure 4:
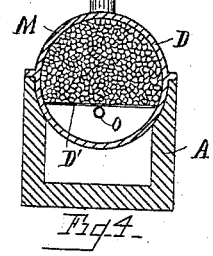

In the drawings, Figure 1 is a side elevation of a complete apparatus, the side of the base-frame being removed to disclose the burners. Fig. 2 is a longitudinal vertical sectional view of the same. Fig. 3 is a longitudinal vertical sectional view of the chamber through which the combined vapors are caused to pass for converting the sulphur contained in the oil into a sulphureted hydrogen by the influence of a high degree of temperature to which the combined vapors are subjected while traversing the interstices of the densely-packed chamber. Fig. 4 is a transverse view on lines $x\,x$, Fig. 3, the two last-named views being drawn on an enlarged scale.

A designates a base-frame, which may be the ordinary brick setting, if desired, and upon which is suspended a boiler B, a vaporizer C, and a desulphurizing-chamber D, through which the combined vapors from boiler B and vaporizer C are caused to pass, and after being subjected to a degree of heat sufficient to release the sulphur from the hydrocarbon oil, and by the apparent affinity of the hydrogen contained in the steam therefor, it is thoroughly separated from the oil, and after the entire mass is condensed in pipes E, passing through a condenser F and allowed to flow into a tank, the water of condensation containing sulphureted hydrogen gravitates to the bottom with the distillate upon the top thereof of a fire-test grade suitable for illuminating purposes.

Chamber D is connected with a vertical cylindrical chamber F' by means of a coupling F'', above which is arranged a perforated diaphragm G, adapted to support a filling of gravel G', the chamber being preferably filled to about one-half its height, leaving a space above the gravel, into which is inserted the end H of a pipe I, leading from a dome J in the boiler B, the end H extending sufficiently into the chamber F' to cause a vacuum in the same when steam is received therein sufficient to siphon the vaporized hydrocarbon oil contained in the vaporizer C, there being a pipe K leading from a dome L in the vaporizer, and tapped into the upper end of chamber F'.

Chamber D is formed with a perforated diaphragm D', extending across the same longitudinally, preferably about one-third the height thereof, upon which rests a filling of gravel M, entirely filling the remaining upper portion of the vaporizer, the pipe E and coupling F'' being tapped into the vaporizer so filled.

N designates a pipe tapped into the dome J of the boiler and provided with a perforated end portion O, which extends into the desulphurizing-chamber below the diaphragm for the purpose of delivering a series of jets of steam thereto, as will be more fully explained.

P designates a pipe designed to conduct either a gaseous or liquid fuel to burners Q, located beneath the boiler, vaporizer, and desulphurizing-chamber for the purpose of generating steam in the boiler, vaporizing the oil in the vaporizing-chamber, and heating the combined vapor to a degree to atomize the same and release the sulphur, which unites with and is carried off with the water of condensation.

It has been found that to insure coalescence of the hydrogen and sulphur there must be an intimate commingling of the steam and hydrocarbon vapor in a proper proportion prior to the release of the sulphur by an intensified degree of heat. To insure this intimate commingling the vapors are first caused to pass through the gravel in chamber F', wherein by reason of the concussion caused by the jet of steam forcing the intermingled vapors rapidly through the gravel they are atomized, and then passed into the desulphurizing-chamber D, where the commingled vapors are heated to a temperature sufficiently high to cause the sulphur to separate from the oil vapor and combine with the hydrogen, this temperature being from 400° to 600° Fahrenheit throughout the entire interior surface of the chamber by reason of the conductivity of heat due to the gravel filling. To prevent discoloration or injury to the hydrocarbon vapor while being subjected to the intense heat necessary to insure disintegration there is a series of jets of steam impinging upon and rising through the gravel from the perforated end O of pipe N, which in the process of superheating from the normal temperature of from 212° to 250° Fahrenheit attracts and assists in bleaching and deodorizing the oil vapors by acting as a re-enforcement to the superheated steam originally passed with the hydrocarbon vapor to the desulphurizing-chamber and passes off with the same through the condensing-pipes to the tank.

The action of the gravel is to not only conduct the heat from burner Q uniformly throughout the densely-packed space, but by reason of the laxity of the mass to induce a flow through the same, and yet sufficiently impinge upon the volume to sufficiently disintegrate the same to release the sulphur and other refractory components and cause the same to attract to the hydrogen, whereby the water of condensation is of a black or inky color of sulphurous odor, thereby leaving the distillate bleached, deodorized, and of a high-grade fire-test. From the above description the operation will be readily understood.

The fuel is ignited at the several burners Q, which are differentiated to raise steam in boiler B at a normal temperature or from 212° to 240°, the same temperature being maintained in the vaporizing-chamber C, whereby the steam is caused to flow with pressure into chamber F', causing a vacuum to draw the hydrocarbon vapor from chamber C to intermingle therewith and be forced through the gravel in said chamber with the effect of disintegrating somewhat the molecules of the same, the pressure of steam urging the intermingled vapors into the intensely-heated desulphurizing-chamber, and causing the same to contact with the gravel in its sinuous course through the interstices formed thereby, and being subjected to a degree of heat that releases the sulphur, the disintegrated vapor, meeting the steam jetted through the perforated end O of pipe N, is attracted thereto and commingles to gravitate when entering the tank after passing through the condensing-chamber F, and the distillate is drawn off from the surface thereof as a practically-uniform grade of fire-test illuminating-oil.

It will be seen that by first "breaking" the oil and intimately intermixing the vapors of oil and steam in chamber F', by forcing the same against and through the gravel deposit prior to subjecting the same to an intense heat, and that by re-enforcing the vapors by live steam when entering the desulphurizing-chamber, there is not only a provision for preventing discoloration of the oil from burning, but the sulphur when released coalesces with the hydrogen and flows therewith to the settling-tank.

What I claim is—

1. In an apparatus for refining oils, a steam-generator and an oil-vaporizing chamber, in combination with a desulphurizing-chamber containing gravel or other like substance, an intermediate chamber partially filled with gravel and connected with the desulphurizing-chamber, and pipes connecting the steam-generator and oil-vaporizing chamber with said intermediate chamber, as and for the purposes set forth.

2. In an apparatus for refining oils, a steam-generator and an oil-vaporizing chamber, in combination with a desulphurizing-chamber containing gravel or other like substance, a series of steam-jets arranged to inject steam into the mass of gravel in the desulphurizing-chamber, an intermediate vertical chamber partially filled with gravel and connected with the desulphurizing-chamber, a steam-pipe leading from the generator into the upper portion of said vertical chamber, and a pipe leading from the oil-vaporizing chamber into the vertical chamber above the end of said steam-pipe, as and for the purposes set forth.

3. In an apparatus for refining oils, a steam-generator and an oil-vaporizing chamber, in combination with a horizontal chamber, a perforated plate dividing said chamber horizontally, the upper portion being filled with gravel, a steam-pipe leading from the generator into the lower portion of said chamber and there perforated, a vertical chamber partially filled with gravel and connected with the horizontal chamber, a steam-pipe leading from the generator into the upper portion of the vertical chamber, and a pipe leading from the vaporizer into the vertical chamber above the end of said steam-pipe, as and for the purposes set forth.

4. An apparatus for refining oils, comprising a steam-generator, an oil-vaporizing chamber, a desulphurizing-chamber filled with gravel, a condenser connected with the desulphurizing-chamber, a series of steam-jets arranged to inject steam into the mass of gravel in the desulphurizing-chamber, a vertical chamber partially filled with gravel and connected with the desulphurizing-chamber, a steam-pipe leading from the generator into the upper portion of the vertical chamber, a pipe leading from the vaporizer into the vertical chamber above the end of said steam-pipe, and means for heating the generator, the vaporizer, and the desulphurizing-chamber, for the purposes stated.

In testimony that I claim the foregoing as my own I hereby affix my signature in presence of two witnesses.

BENJAMIN N. HAWES.

Witnesses:
WILLIAM WEBSTER,
CARROLL J. WEBSTER.